United States Patent Office 3,392,038
Patented July 9, 1968

3,392,038
PROTEIN AND ALKALI METAL
SILICATE ADHESIVE
Alexander E. Teyral, Mentor, Ohio, assignor to Diamond Shamrock Corporation, a corporation of Delaware
No Drawing. Filed Sept. 8, 1964, Ser. No. 395,051
13 Claims. (Cl. 106—79)

ABSTRACT OF THE DISCLOSURE

An unhydrolyzed vegetable protein-alkali metal silicate adhesive composition has its useful life extended by the addition thereto of an alkaline material selected from the group consisting of alkali metal and ammonium carbonates and bicarbonates. At least a portion of this alkaline material must be added at the initial stage of the formulation of the adhesive composition.

---

This invention relates to silicate-protein adhesives, and more particularly to adhesives used in the manufacture of boxboard and similar products, said adhesives being characterized by low viscosity, long shelf life, high water resistance and high bond strength.

There has long been a need for low-cost water-resistant adhesives suitable for use in the manufacture of laminated products such as corrugated board, paper tubes, paper-to-wood laminates and the like. Such adhesives have been in particularly high demand in recent years for the manufacture of boxboard for use in export shipment. Silicate adhesives have been used for these purposes because of their low cost and the strong bond they produce. However, conventional silicate adhesives are not sufficiently water-resistant to meet some of the more rigid specifications which have been recently drawn for paperboard used in export shipment. In particular, United States Government specifications require that such boxboard shall have a high bursting strength not only when dry, but also after immersion for twenty-four hours in water. Straight silicate adhesives do not meet these requirements.

A number of mixed adhesives have been developed which are more highly water-resistant than straight silicate adhesives. For example U.S. Patent 2,894,847 describes a water-resistant protein-silicate adhesive which is prepared from a specific type of unhydrolyzed protein characterized by its freedom from carbohydrates, ligniferous matter, denaturation and hydrolysis products, and water-soluble materials. Suitable proteins for this purpose are those derived from soybean flour and sold by the Ralston Purina Company under the name of "Industrial Protein" and by the Buckeye Cotton Oil Company under the name of "Buckeye Protein." According to the teachings of this patent, the desired adhesive contains no extraneous alkali other than that present in the silicate.

A principal disadvantage of the protein-silicate adhesives of the prior art, including those of U.S. Patent 2,894,847, is their short shelf life. These adhesives increase in viscosity on ageing even to the point of solidifying to a gel. This solidification often takes place within a very short time and their shelf life is usually limited to a day or so. Thus, they must be used almost immediately after mixing.

A principal object of the present invention, therefore, is to provide a water-resistant adhesive which is characterized by relatively little tendency to increase in viscosity with the passage of time.

A further object is to provide an adhesive with long shelf life, high water resistance and high bond strength.

Other objects will in part be obvious and will in part appear hereinafter.

It has previously been believed and taught by the prior art (e.g., U.S. Patent 2,681,290) that the presence of extraneous alkali in protein-silicate adhesives has a detrimental effect on bond strength. However, applicant has discovered that the presence of certain alkaline materials in certain restricted amounts does not adversely affect bond strength. Moreover, the presence of these materials improves the properties of protein-silicate adhesives in that it suppresses viscosity increase.

Accordingly, the adhesive composition of the present invention comprises (A) about 5% to 25% (preferably 10–12%) by weight of a high molecular weight, unhydrolyzed vegetable protein, (B) about 10% to 30% (preferably 20–25%) by weight of an aqueous alkali metal silicate with a silica to alkali metal oxide weight ratio between about 1.5:1 and 4.0:1, (C) an alkaline material selected from the group consisting of alkali metal and ammonium carbonates and bicarbonates in an amount from about 1% to about 10% by weight of the protein, and (D) the balance water.

Liquid alkali metal silicates which may be used to form the adhesives of this invention are preferably sodium silicates, but may include silicates of the other alkali metals—that is, lithium, potassium, rubidium and cesium. They have a silica to sodium oxide weight ratio of between about 1.5:1 and 4.0:1 and a solids content between about 35% and 55% by weight. A number of suitable sodium silicates are listed in Table I.

TABLE I

| Grade | Percent | | | $SiO_2:Na_2O$, Wt. Ratio | Gravity, °Bé. | Viscosity, Stormer Seconds |
|---|---|---|---|---|---|---|
| | $Na_2O$ | $SiO_2$ | Solids Content | | | |
| 33 | 8.8 | 29.1 | 37.9 | 3.30 | 41.0 | 110 |
| 40 | 9.1 | 29.2 | 38.3 | 3.22 | 41.5 | 75 |
| 42 | 9.3 | 30.0 | 39.3 | 3.22 | 42.5 | 140 |
| 42 Water White | 10.6 | 26.9 | 37.5 | 2.54 | 42.0 | 23 |
| JW-25 | 10.6 | 26.9 | 37.5 | 2.54 | 42.0 | 23 |
| 47 | 11.2 | 31.9 | 43.1 | 2.84 | 47.0 | 250 |
| 50 | 14.7 | 29.4 | 44.1 | 2.00 | 50.0 | 122 |
| 52 | 13.9 | 33.4 | 47.3 | 2.40 | 52.0 | 640 |
| 58 | 19.7 | 31.2 | 50.9 | 1.58 | 58.0 | 3,000 |
| 60 | 19.0 | 35.5 | 54.5 | 1.87 | 60.0 | 18,000 |
| 49 FG | 12.4 | 32.1 | 44.5 | 2.58 | 49.0 | 230 |

Among these silicates, Grade 33 is preferred.

The protein used in the adhesive composition of this invention is preferably that specified in U.S. Patent 2,894,847. This protein is derived from an oil seed flour, preferably soybean flour, by aqueous extraction at a pH between about 6.5 and 8, followed by adjustment of the pH to the isoelectric point of the extracted protein, whereby the desired protein fraction precipitates out of the aqueous solution. As pointed out hereinabove, a suitable vegetable protein is sold by the Ralston Purina Company as "Industrial Protein" and by the Buckeye Cotton Oil Company under the name of "Buckeye Protein." Although other proteins may be used, the one specified hereinabove is advantageous in that it provides an adhesive which has a very high wet strength.

According to this invention, there is added to the adhesive made from the protein and silicate described hereinabove an alkaline material selected from the group consisting of alkali metal and ammonium carbonates and bicarbonates, in an amount from about 1% to about 10%, preferably about 6–10%, of the weight of protein present. Alkaline materials which are particularly suitable include sodium carbonate, sodium bicarbonate and ammonium bicarbonate; sodium bicarbonate is preferred.

Other ingredients which may be included in the adhesive include, for example, anti-foam agents, preservatives, cross-linking agents and wetting agents. Pine oil is a typical preservative and anti-foam agent, and hexamethylenetetramine and urea are preferred crosslinking agents. These ingredients are preferably present in amounts between about 0.3% and 2% by weight. While a wetting agent is not essential, its presence in amounts up to about 0.1% may be advantageous in some cases. Other materials such as clays, triethanolamine and the like may be added to provide specialized adhesives for certain purposes.

A typical and preferred adhesive of the present invention is constituted as follows. (All percentages are by weight.)

| | Percent |
|---|---|
| Protein | 11.3 |
| Grade 33 sodium silicate | 22.5 |
| Sodium bicarbonate (7% of weight of protein) | 0.8 |
| Pine oil | 0.4 |
| Hexamethylenetetramine | 0.4 |
| Water | 64.6 |
| | 100.0 |

The solids content of this adhesive is about 19%.

It is preferred that the viscosity of a protein-silicate adhesive be between about 4 and 16 poises. Whereas prior art adhesives have increased rapidly in viscosity with age, often attaining a viscosity of 40 poises or greater in one or two days, the adhesives of the present invention may be stored for 10 to 15 days or longer without increasing in viscosity above about 16 to 18 poises. The actual viscosity increase will vary somewhat with the percentages of the various ingredients and the method of mixing of the composition. In particular, the percentage of alkaline material in the adhesive has a strong effect on viscosity and ageing qualities. It is important to note that, while the tendency of adhesives of the protein-silicate type is to increase in viscosity with the passage of time, this increase may not be constant and may even reverse itself. Thus, an adhesive may attain a maximum viscosity of the order of 30 to 35 poises within 20 to 30 days, and the viscosity may then decrease to about 15 to 20 poises. However, the viscosity of the material should preferably not exceed 16 to 18 poises at the time of use.

In preparing the adhesives of this invention, the ingredients are added one at a time or in combination to the required amount of water, with stirring, at a temperature between about 70° and 125° F. In a preferred embodiment, the preservative (e.g., pine oil) and protein are introduced first in combination with all or part of the alkaline material (e.g., sodium bicarbonate). The mixture is then stirred for a few minutes after which the alkali metal silicate is added gradually, with constant stirring. Other ingredients are then added to provide the final product. While it is necessary to add at least a portion of the alkaline material at the beginning of the mixture sequence, along with the protein, not all of the alkaline material need be added at this time; a portion of it may be added at the end of the mixing operation along with or after other ingredients such as crosslinkers. Thus, for example, if the amount of alkaline material is 7% of the amount of protein in the adhesive mixture, 1–6% may be added at the beginning of the mixing process, and the remainder at the end. The final product desirably has a solids content between about 19% and 30%, the preferred range being 19–25%.

The adhesives of this invention may be used wherever a water-resistant adhesive is required in the manufacture of laminated products. Thus, corrugated paper board, plywood, paper tubes, paper-to-wood laminates, metal foil-to-paper laminates and the like may be manufactured with these adhesives. They are particularly useful, however, in the manufacture of corrugated boxboard. More particularly, water-resistant corrugated boxboard may be made by spraying cardboard liners and corrugated members with the adhesive according to the methods described in U.S. Patents 1,199,508 and 3,077,222. Alternatively, the adhesive need not be sprayed on the entire surface of the board but may be applied only to the tips of the flutes of the corrugated members, whereby they are firmly attached by means of a water-resistant bond to the liner portions of the board. It will be apparent, however, that a more water-resistant board is obtained by spraying the entire surface of the corrugated portions with the adhesive than by merely coating the tips of the flutes therewith.

The bond strength of the adhesives of the present invention is tested in the following way. Samples of corrugated board are fabricated by applying the adhesive to the tips of the flutes of the corrugated member which is then glued to a liner member. The adhesive is set by applying pressure at a temperature of about 250–330° F. and is then aged overnight at 75°±5° F. and a relative humidity of 60±12%. The force, in pounds, required to break the adhesive bond is then measured; this value is the "dry-bond strength" value.

An identical portion of board is soaked in water for 24 hours and is then aged in the same temperature-humidity environment as in the dry-bond strength test. The adhesive strength of the board thus treated is then measured; this is the "wet-bond strength" test.

Percent recovery is calculated by dividing the wet-bond strength by the dry-bond strength and multiplying the quotient by 100. Since increased adhesive penetration may be attained by contact with water, it is possible to obtain a percent recovery greater than 100%.

It is desirable that weather-resistant boxboard have a wet-bond strength in excess of 50 pounds, and a recovery in excess of 75%. The adhesives of this invention provide a board satisfying or exceeding these requirements. Further, the viscosity of these adhesives remains in a workable range for at least 30 days and often for 6–8 weeks; and the set time required for the adhesives is less than that for many adhesives of the prior art.

The invention is illustrated by the following examples.

Examples 1–6

A number of silicate-protein adhesive compositions are prepared by the following procedure. Water, 790 g., is heated to about 100° F. and a predetermined amount of sodium bicarbonate is added. Following the addition of the sodium bicarbonate, 4.75 g. of pine oil and 125 g. of "Industrial Protein" is introduced. The mixture is stirred for three minutes. Grade 33 sodium silicate is introduced in two portions of 25 g. and 225 g. respectively, with five minutes of stirring between portions. After 19 minutes of stirring, a solution of 4.75 g. of hexamethylenetetramine in 7 ml. of water is added. Stirring is continued for an additional minute.

The final adhesive composition contains the following approximate ingredient percentages by weight. (The exact percentages for each ingredient will depend on the amount of sodium bicarbonate in the mixture.)

| | Percent |
|---|---|
| Protein | 10.5 |
| Silicate (Grade 33) | 21.0 |
| Pine oil | 0.4 |
| Hexamethylenetetramine | 0.4 |

The adhesive is aged for 41 days, with viscosity measurements being made at intervals. Results are given in Table II for compositions prepared by the above procedure and containing various amounts of sodium bicarbonate.

TABLE II

| Example | NaHCO$_3$, g. (percent of Protein) | Viscosity (poises) with age (days) | | | | | | |
|---|---|---|---|---|---|---|---|---|
| | | 1 | 4 | 7 | 14 | 21 | 31 | 41 |
| 1 | 2.5 (2) | 1.3 | 4.6 | 16.0 | 19.2 | 31.6 | 22.8 | 16.4 |
| 2 | 5.0 (4) | 0.5 | 7.5 | 9.6 | 12.8 | 14.8 | 12.8 | 10.4 |
| 3 | 7.5 (6) | 0.7 | 4.4 | 4.6 | 6.3 | 8.0 | 8.0 | 7.2 |
| 4 | 10.0 (8) | 0.7 | 4.5 | 4.1 | 5.0 | 6.0 | 6.2 | 6.8 |
| 5 | 12.5 (10) | 8.7 | 5.1 | 4.7 | 5.5 | 6.1 | 6.7 | 7.2 |
| 6 | 15.0 (12) | 24.2 | 16.4 | 14.4 | 14.0 | 14.4 | 15.2 | 16.0 |

As will be seen from Table II, a sodium bicarbonate content of 6–10% of the weight of the protein gives optimum viscosity values over a long ageing period.

Examples 7–11

Five adhesive compositions containing various amounts of sodium bicarbonate are prepared and aged according to the methods of Examples 1–6. Viscosity measurements are taken at intervals during the ageing process. After the indicated ageing period, the adhesives are used to make samples of boxboard by the following procedure. Adhesive is applied to the tips of the flutes of a corrugated member which is then adhered to a kraft liner. The adhesive is set at a temperature of 325° F. Dry-bond and wet-bond strengths are run on samples of board made by this procedure and percent recovery is calculated.

In Table III, the percentage compositions of the adhesives of Examples 7–11 are given; Table IV gives viscosity and bond strength results for these adhesives.

TABLE III

|  | Example | | | | |
|---|---|---|---|---|---|
|  | 7 | 8 | 9 | 10 | 11 |
| Silicate (Grade 33) | 21.2 | 22.0 | 21.1 | 21.0 | 21.0 |
| Protein | 10.2 | 11.0 | 10.6 | 10.5 | 10.5 |
| Pine Oil | 0.4 | 0.4 | 0.4 | 0.4 | 0.4 |
| Hexamethylenetetramine | 0.4 | 0.4 | 0.4 | 0.4 | 0.4 |
| Sodium bicarbonate | 0.2 | 0.4 | 0.6 | 0.7 | 0.8 |
| Water | *67.6 | 65.8 | *66.9 | 67.0 | 66.9 |
|  | 100.0 | 100.0 | 100.0 | 100.0 | 100.0 |

* In these examples, the percentage of water includes about 0.08% of "Ultrawet DS," a sodium alkylbenzenesulfonate wetting agent added in a 20% aqueous solution with the hexamethylenetetramine.

TABLE IV

| Example | NaHCO₃, percent of Protein | Viscosity (poises) with age (days) | | | | | Age (days) at time of testing | Dry-bond strength, lbs. | Wet-bond strength, lbs. | Percent Recovery |
|---|---|---|---|---|---|---|---|---|---|---|
|  |  | 1 | 10 | 20 | 30 | Final |  |  |  |  |
| 7 | 2 | 0.9 | 11.2 |  | 8.3 | 8.3 | 30 | 80 | 67 | 83 |
| 8 | 4 | 0.9 | 11.6 |  |  | 8.7 | 37 | 69 | 56 | 81 |
| 9 | 6 | 5.0 | 13.6 | 12.0 |  |  | 1 | 55 | 59 | 107 |
| 10 | 7 | 1.2 |  |  |  | 6.3 | 14 | 62 | 61 | 98 |
| 11 | 7.5 | 1.6 |  |  |  | 9.0 | 19 | 66 | 57 | 86 |

It will be seen that all the samples tabulated in Table III have the properties desired for weather-resistant boxboard (50 lbs. wet strength, 75% recovery).

Examples 12–17

Adhesive compositions are made according to the method of Examples 1–6, except that a portion of the sodium bicarbonate is added at the end of the mixing process along with the hexamethylenetetramine. The over-all composition of the adhesives in these examples is as follows.

| | Percent |
|---|---|
| Silicate (Grade 33) | 23.6 |
| Protein | 11.8 |
| Pine oil | 0.5 |
| Hexamethylenetetramine | 0.3 |
| Sodium bicarbonate (7% of weight of protein) | 0.8 |
| Water | ¹63.0 |
|  | 100.0 |

¹ Includes 0.08% "Ultrawet DS."

Viscosity measurements taken during ageing of these adhesives are tabulated in Table V.

TABLE V

| Example | NaHCO₃, percent of Protein | | Viscosity (poises) with age (days) | | | | | |
|---|---|---|---|---|---|---|---|---|
|  | Start | End | 0 | 4 | 5 | 10 | 15 | 17 |
| 12 | 7 | 0 | 2.8 |  | 6.9 | 8.1 | 12.8 |  |
| 13 | 5 | 2 | 2.9 | 6.8 |  | 8.2 |  | 12.4 |
| 14 | 4 | 3 | 3.0 | 5.9 |  | 7.2 |  | 12.4 |
| 15 | 3 | 4 | 2.9 | 10.0 |  | 13.2 |  | 17.2 |
| 16 | 2 | 5 | 3.1 | 10.0 |  | 12.8 |  | 17.2 |
| 17 | 0 | 7 | 4.1 |  | 40 |  | 40 |  |

It will be seen from Table V that at least a small amount of alkaline material must be added at the beginning of the mixing process in order to attain the desirable results of this invention. When all of the bicarbonate is added at the end of the process, the viscosity rapidly increases until it reaches a maximum of 40 poises, far above the useable range.

Example 18

The following example shows the effect of using other alkaline materials in the adhesive compositions of this invention.

An adhesive is prepared by the methods of Examples 1–6, with the following composition.

| | Percent |
|---|---|
| Silicate (Grade 33) | 21.0 |
| Protein | 10.5 |
| Pine oil | 0.4 |
| Hexamethylenetetramine | 0.4 |
| Sodium carbonate | 0.9 |
| Water | 66.8 |
|  | 100.0 |

Viscosity measurements taken on this adhesive composition are given in Table VI.

TABLE VI

| Age, days: | Viscosity, poises |
|---|---|
| 5 | 11.6 |
| 12 | 16.4 |
| 21 | 17.6 |
| 31 | 12.4 |
| 42 | 6.5 |

This example shows that sodium carbonate is approximately equivalent to sodium bicarbonate in its effect on the viscosity of the protein-silicate adhesives.

It is to be understood that the invention is not limited by the specific examples and embodiments described hereinabove, but includes such changes and modifications as may be apparent to one skilled in the art upon reading the appended claims.

What is claimed is:

1. A method for stabilizing an adhesive composition, said composition comprising (A) about 5% to 25% by weight of a high molecular weight, unhydrolyzed vegetable protein, (B) about 10% to 30% by weight of an aqueous alkali metal silicate with a silica to alkali metal oxide weight ratio between about 1.5:1 and 4.0:1, and (C) the balance water, which method comprises adding 1% to 10% by weight, on a protein basis, of an alkaline material selected from the group consisting of alkali metal and ammonium carbonates and bicarbonates and which method is characterized by adding at least a portion of said alkaline material, with stirring, to the protein prior to the addition of said silicate.

2. A method for the preparation of an adhesive composition which method comprises the steps of:
 (a) mixing about 5 percent to 25 percent by weight, on a total adhesive basis, of a high molecular weight, unhydrolyzed vegetable protein, about 1 percent to 10 percent by weight, on a protein basis, of an alkaline material selected from the group consisting of alkali metal and ammonium carbonate and bicarbonates and water and,
 (b) adding, with mixing, about 10 percent to 30 percent by weight, on a total adhesive basis, of an aqueous alkali metal silicate with a silicon dioxide to alkali metal oxide weight ratio between about 1.5:1 and 4.0:1,
the balance of said composition being water.

3. A method as in claim 2 wherein only a portion of the alkaline material is added in step (a), the remainder being added in step (b).

4. A method as in claim 2 wherein from 0.3-2% by weight of a preservative is added in step (a).

5. A method as in claim 2 wherein from 0.3-2% by weight of a cross-linking agent is added in step (b).

6. A method as in claim 2 wherein up to about 0.1% by weight of a wetting agent is added in step (b).

7. A product as produced by the method of claim 2.

8. The method for the preparation of an adhesive composition of claim 2 wherein the protein is one which is derived from soybean flour by aqueous extraction at a pH between about 6.5 and 8 followed by adjustment of the pH to the isoelectric point of the extracted protein, whereby the desired protein fraction precipitates out of the aqueous solution.

9. The method for the preparation of an adhesive composition of claim 2 wherein the alkali metal silicate is sodium silicate.

10. The method for the preparation of an adhesive composition of claim 2 wherein the alkali metal silicate is a sodium silicate and has a silica to sodium oxide weight ratio of 3.30:1, a solids content of 37.9 percent and a Be. gravity of 41.0°.

11. The method for the preparation of an adhesive composition of claim 2 wherein the alkaline material is sodium bicarbonate.

12. A method for the preparation of an adhesive composition which comprises the steps of;
(a) mixing about 5 to 25 percent, on a total adhesive basis, of a high molecular weight, unhydrolyzed vegetable protein, about 1 to 10 percent, on a protein basis, of an alkaline material selected from the group consisting of alkali metal and ammonium carbonates and bicarbonates, 0.3 to 2 percent on a total basis, of a preservative and water, all percent by weight, and
(b) adding, with mixing, about 10 to 30 percent of an aqueous alkali metal silicate with a silicon dioxide to alkali metal oxide weight ratio between about 1.5:1 and 4.0:1 and 0.3 to 2 percent of a cross-linking agent, all percents by weight on a total adhesive basis,
the balance of said composition being water.

13. A product as produced by the method of claim 12.

References Cited
UNITED STATES PATENTS

| | | | |
|---|---|---|---|
| 1,950,060 | 3/1934 | Osgood | 106—79 |
| 1,976,435 | 10/1934 | Cone et al. | 106—79 |
| 2,457,108 | 12/1948 | Baker et al. | 106—79 |
| 2,894,847 | 7/1959 | Wright | 106—79 |
| 3,058,835 | 10/1962 | Sheeran | 106—79 |
| 3,206,320 | 9/1965 | Davidson | 106—161 |
| 3,206,321 | 9/1965 | Davidson | 106—161 |
| 3,274,042 | 9/1966 | Gilboe et al. | 106—154 |

TOBIAS E. LEVOW, *Primary Examiner.*

S. E. MOTT, *Assistant Examiner.*